United States Patent Office 3,373,182
Patented Mar. 12, 1968

3,373,182
PURIFICATION OF ISOCYANATES BY REDUCTION OF THE HYDROLYZABLE CHLORINE AND ACID CONTENT
Eugene L. Powers, New Martinsville, W. Va., assignor to Mobay Chemical Company, Pittsburgh, Pa., a corporation of Delaware
No Drawing. Continuation-in-part of application Ser. No. 395,952, Sept. 11, 1964. This application June 30, 1965, Ser. No. 468,619
10 Claims. (Cl. 260—453)

This invention relates to organic isocyanates and to a method of preparing the same and more particularly, to an improved method for removing the hydrolyzable chlorine and reducing the acidity of organic isocyanates prepared by the usual methods. This application is a continuation-in-part of copending application Ser. No. 395,952, filed Sept. 11, 1964, now U.S. Patent No. 3,264,336.

It is to be understood that the term "hydrolyzable chlorine" refers to labile chlorine atoms which are loosely bound in a compound and not to a chlorine atom that is tightly chemically bound such as chlorine in chlorobenzene. This value is determined by extracting the chlorine from the isocyanate by hot solution in an aqueous-methanol solvent, or liberating the chlorine on hydrolysis of the compound with water. The extract is then subjected to a potentiometric titration of the chloride ion concentration with a standard silver nitrate solution. From the amount of silver nitrate necessary, the percentage of the hydrolyzable chlorine can be determined by a simple calculation. The term "acidity" as understood here is determined essentially in the same manner as the "hydrolyzable chlorine" content except dilute caustic is used in the titration of the free HCl or acid. From the amount of caustic used, the percent acidity as HCl can be determined.

Organic polyisocyanates are reacted with organic compounds having groups containing reactive hydrogen atoms in the preparation of a polyurethane plastic. The reaction rate of an isocyanate group with a reactive hydrogen atom is reduced by the presence of hydrolyzable chlorine in the isocyanate, which must either be reduced or removed completely in order to effectuate the reaction. Slocombe, in U.S. Patent 2,620,349, proposes to adjust the hydrolyzable chlorine content in order to predetermine the reaction rate of isocyanates. Generally, however, any method of adjusting the hydrolyzable chlorine and acidity content of an isocyanate involves reducing it to a very low value initially by a fractional distillation process. A serious problem with a fractional distillation process is that if the isocyanate being distilled has a boiling point near the boiling point of the hydrolyzable chlorine containing material, then a fractional distillation process is inconvenient, costly, and in most cases, inoperative. Further, a high boiling isocyanate is difficult to fractionally distill without high yield losses due to prolonged overheating.

It is therefore an object of this invention to provide an improved method for reducing the hydrolyzable chlorine and acidity content of an organic isocyanate.

Another object of this invention is to reduce the hydrolyzable chlorine and acidity content of an organic isocyanate by a method which avoids costly and inconvenient distillation steps, thereby allowing one to predetermine the reactivity of the isocyanate with a reactive hydrogen atom.

Still another object of the invention is to adjust the hydrolyzable chlorine and acidity content of an organic isocyanate by a method which is adapted for use either during the production of the isocyanate or after the isocyanate has been made.

In my previous application, Ser. No. 395,952, I disclosed that the hydrolyzable chlorine and acidity content of an organic isocyanate could be reduced by treating the isocyanate with an effective amount of cadmium laurate, cobaltic benzoate and ferric naphthenate. I have now found, however, that the foregoing objects and others which will become apparent from the following description may be best accomplished in accordance with the present invention by treating the isocyanate containing hydrolyzable chlorides with an effective amount (that is, and amount sufficient to reduce the hydrolyzable chlorides) of cadmium naphthenate, cobalt naphthenate, copper naphthenate, lead naphthenate, manganese naphthenate or zinc naphthenate or mixtures thereof (hereinafter referred to as metallic compounds) and distilling the resulting mixture to remove the isocyanate. The invention thus contemplates a method for adjusting the hydrolyzable chlorine and acidity of an organic isocyanate to any predetermined level by first reducing it through polymerization or decomposition of the hydrolyzable chlorine and acidity compounds in the presence of one of the above mentioned metallic compounds to form a material which can be separated from the isocyanate by distillation, followed by the addition of a known hydrolyzable chlorine-bearing or compatible acidic material of predetermined acidity. The organic isocyanate and metallic compound may be mixed together in any suitable manner. For example, solid or liquid metallic compounds can be added to the organic isocyanate. The organic isocyanate can be added to the metallic compound. The metallic compound can be dissolved in a solvent therefore which is compatible with the organic isocyanate and the solution can be mixed with the organic isocyanate. The metallic compound can be added to a solution of the crude or refined isocyanate or a compatible solvent to form a slurry or solution and then introduced into a larger amount of isocyanate.

Other compounds such as ferric chloride and iron benzoate have been proposed heretofore as suitable materials for reducing the hydrolyzable chloride content of isocyanates, but these compounds suffer from a distinct disadvantage in that they are not liquid and therefore cannot be easily introduced into the production system, requiring special handling before they can be used.

It is to be understood that the synthesis of the organic isocyanate does not form a part of this invention. The product from any method of preparing organic isocyanates which results in the final product having a hydrolyzable chlorine or acidity content may be treated by the process of this invention to remove the hydrolyzable chlorine containing substituents. As an example of a suitable method of preparing organic isocyanates, the corresponding amine or amine salts are reacted with phosgene in the manner known in the art. The following patents set forth procedures which may be used in the preparation of the organic isocyanates: 2,480,089; 2,680,127; 2,680,128; 2,733,254; 2,837,554; 2,839,559 and 2,875,225. The phosgenation procedure is generally utilized in the preparation of isocyanates because of the economy of the method and the resulting superior yields obtained.

A particularly suitable method of preparing an organic isocyanate is set forth in Canadian Patent 537,484 wherein a solution of phosgene and a solution of an organic amine are introduced into a high speed mixer by separate conduits. This mixture is then fed to a reactor in which the hot phosgenation step takes place. The solvent in which the amine and phosgene were dissolved is then removed by distillation which is generally carried out under a vacuum.

In accordance with this invention, the hydrolyzable chlorine reducing step may be conducted at any one of a number of stages in the process. For example, the metallic compound may be introduced into a solution of an organic isocyanate in a solvent immediately after the hot-phosgenation step of the procedure for preparing an isocyanate. It may also be conducted after the inert solvent has been removed from the isocyanate by a distillation step. Of course, since these further steps, such as a distillation or a number of distillation steps, generally are conducted for the purpose of purifying the organic isocyanate, the hydrolyzable chlorine content and acidity are also generally reduced to a certain extent. Therefore, the amount of the metallic compound which is necessary to reduce the hydrolyzable chlorine and acidity to a minimum is dependent upon the hydrolyzable chlorine and acidity content remaining in the isocyanate at the time the mixture with the metallic compound is carried out. This invention is particularly suitable for the reason that the hydrolyzable chlorine and acidity content may be reduced at any time after the preparation of the isocyanate is completed. That is, the isocyanate may be prepared by one manufacturer and shipped to a purchaser who may then reduce the hydrolyzable chlorine and acidity content by simply stirring into the isocyanate one of the metallic compounds mentioned above and then carrying out a simple straight forward distillation.

In accordance with this invention, it has been found that certain metallic compounds will produce the desired result of reducing the hydrolyzable chlorine and acidity content of organic isocyanates. The metallic compounds which have been found operable are cadmium naphthenate, cobalt naphthenate, copper naphthenate, lead naphthenate, manganese naphthenate, or zinc naphthenate or mixtures thereof. The treatment with the metallic compounds is carried out by stirring it into the hydrolyzable chlorine containing isocyanate, either alone or in solution in an inert solvent. It is preferred that the treatment with the metallic compound be carried out under anhydrous conditions since the presence of water will result in a loss of the isocyanate due to the formation of urea linkages. This procedure may be carried out at any suitable temperature; however, elevated temperatures are preferred in order to shorten the period necessary to reduce the hydrolyzable chlorine and acidity content to a minimum. The period of time for the treatment is dependent upon the temperature at which the treatment is carried out. The temperature at which the treatment with the metallic compound should take place is to a certain extent determined by the specific properties of the isocyanate being treated. That is, the treatment should be carried out below the boiilng point of the isocyanate and within a range preferably between 50° C. and about 210° C. A period of time of from about 0.5 to about 6 hours is generally sufficient for the minimum hydrolyzable chlorine or acidity content to be reached. However, the hydrolyzable chlorine and acidity content is reduced to some degree even when the isocyanate is distilled immediately after the metallic compound is added. After this treatment, the material including the isocyanate, the metallic compound and the hydrolyzable chlorine and acidic materials, is distilled generally under vacuum to remove the organic isocyanate from the residue of hydrolyzable chlorine and acidic containing substituents.

As stated previously, the quantity of the particular metallic compound used for treating the organic isocyanates depends on the amount of hydrolyzable chlorine and acidic containing substituents present in the particular isocyanate. However, an amount from about 0.01 to about 2 mol percent of any of the materials set forth above is usually sufficient to reduce the hydrolyzable chlorine and acidic content.

The method of the instant invention is applicable to the production of aliphatic, cycloaliphatic, alkaryl, heterocyclic, and aryl mono-, di- and polyisocyanates. Illustrative examples of these are hexyl isocyanate, octyl isocyanate, dodecyl isocyanate, octadecyl isocyanate, ethylene diisocyanate, propylene diisocyanate, tetramethylene diisocyanate, pentamethylene diisocyanate, octamethylene diisocyanate, undecamethylene diisocyanate, dodecamethylene diisocyanate, 3,3'-diisocyanato dipropylether, etc.; cyclohexyl isocyanate, tetra-alpha-naphthyl isocyanate, tetrahydro-beta-naphthyl isocyanate, etc.; cyclopentylene-1,3-diisocyanate, cyclohexylene-1,4-diisocyanate, toluene isocyanate, p-ethylphenyl isocyanate, 2,4-toluylene diisocyanate, 2,6-toluylene diisocyanate and mixtures of 2,4- and 2,6-toluylene diisocyanate, xylylene-1,4-diisocyanate, xylylene-1,3-diisocyanate, 4,4'-diphenylmethane diisocyanate, 4,4'-diphenylpropane diisocyanate, etc.; benzyl isocyanate, phenylethyl isocyanate, p-isocyanato benzyl isocyanate, etc.; phenyl isocyanate, chlorophenyl isocyanate, p-cetylphenyl isocyanate, p-dodecylphenyl isocyanate, 4-dodecyl-2-methyl-phenyl isocyanate, 3-nitro-4-dodecyl phenyl isocyanate, p-cetyloxyphenyl isocyanate, m-phenylene diiisocyanate, p-phenylene diisocyanate, naphthylene - 1,4 - diisocyanate, naphthylene - 1,5 - diisocyanate, 1,2,4-benzene triisocyanate, etc., furfuryl isocyanate, tetrahydrofurfuryl isocyanate, furfurylidene diisocyanate, etc.; p,p',p''-tri-phenylmethane triisocyanate, diphenyl-4,6',4'-triisocyanate and the like. The particular metallic compound used must be selected with its boiling point and that of the isocyanate sufficiently different to permit separation by a simple distillation.

It is again pointed out for the purpose of clarity that this invention is not limited to particular percentages, temperatures and periods of time for which this reaction is to take place for the reason that these variables are dependent upon the condition of the isocyanate when treated in the manner specified herein. If the isocyanate is treated immediately after removal from the hot-phosgenation step in the preparation of the isocyanate, at least one of the variables, that is, the period of time, the quantity of the metallic compound used, or the temperature will exceed that necessary to lower the hydrolyzable chlorine and acidity content of an isocyanate sample which has been twice distilled. That is, to lower the hydrolyzable chloride and acidity content to a given percentage, more of the metallic compound would be required in a crude isocyanate than in a refined isocyanate.

Organic isocyanates treated in accordance with this invention are useful in the preparation of cellular polyurethane materials as well as elastomeric materials. Cellular polyurethanes are useful for manufacturing cushions, pillows, upholstering units of all types and for sound and weather insulation purposes. Elastomeric polyurethanes are useful for the manufacture of vehicle tires, gears, shaft couplings, diaphragms and many other applications.

The invention may be further illustrated by the following examples in which parts are given by weight unless otherwise specified.

*Example 1*

A solution of 2,4-tolylene diamine in o-dichlorobenzene having a concentration of about 15 parts amine to about 285 parts solvent is intimately admixed with liquid phosgene which is at a temperature of about 0° C. The temperature of the tolylene diamine solution prior to mixing is about 75° C. The reaction mixture is then heated to a temperature of about 150° C. for about 3 hours while adding an excess of phosgene. Residual phosgene is next removed by passing nitrogen into the solution. The solvent is then removed by distillation. The yield of 2,4-toluylene diisocyanate is from about 96 percent to about 98 percent of theoretical and has a hydrolyzable chlorine content of about 0.06 percent.

The previous example illustrates one method of preparing toluylene diisocyanate from its corresponding diamine. No particular steps were taken to control or reduce the hydrolyzable chlorine content of the material.

Examples 2 through 5 are conducted in accordance with the following procedure.

The 2,4-toluylene diisocyanate reaction product of Example 1 is introduced in a vessel equipped with an agitating device. The metallic compound is then introduced in the form of a slurry in the 2,4-toluylene diisocyanate and the entire mixture stirred and heated for four hours at 150° C. The toluylene diisocyanate is then removed by vacuum distillation. The conditions of the treatment and results of these examples are set forth in the following table.

| Example No. | Compound | 0.75 g. Catalyst per 500 g. TDI | |
|---|---|---|---|
| | | H.C. in Refined TDI, Percent | Residue After Treatment, Percent |
| 2 | Cadmium Naphthenate | 0.034 | <1 |
| 3 | Cobalt Naphthenate | 0.029 | <1 |
| 4 | Copper Naphthenate | 0.031 | <1 |
| 5 | Lead Naphthenate | 0.024 | 1.6 |
| 6 | Manganese Naphthenate | 0.020 | <1 |
| 7 | Zinc Naphthenate | 0.025 | <1 |
| 8 | Control (none) | 0.046 | <1 |

| Example No. | Compound | 7.5 g. Catalyst per 500 g. TDI | |
|---|---|---|---|
| | | H.C. in Refined TDI, Percent | Residue After Treatment, Percent |
| 9 | Cadmium Naphthenate | <.001 | 1.7 |
| 10 | Cobalt Naphthenate | <.001 | 4.0 |
| 11 | Copper Naphthenate | <.001 | 1.7 |
| 12 | Lead Naphthenate | <.001 | 33.8 |
| 13 | Manganese Naphthenate | .005 | 4.0 |
| 14 | Zinc Naphthenate | <.001 | 2.2 |
| 15 | Control (none) | 0.046 | <1 |

It will be noted from Examples 9 through 14 that an increased amount of the metallic compound will result in a product having substantially no chlorides.

Of course, it is to be understood that any of the previously mentioned isocyanates may be treated in the manner set forth in the examples and that the invention is not limited to only the particular isocyanates set forth in the examples. Further, any of the materials set forth previously as the treating compound may be substituted into the examples to reduce the hydrolyzable chlorine content.

Although the invention has been described in considerable detail for the purpose of illustration, it is to be understood that variations may be made therein by those skilled in the art without departing from the spirit of the invention and the scope of the claims.

What is claimed is:

1. A method of reducing the hydrolyzable chlorine and acidity content of organic isocyanates containing hydrolyzable chlorides which comprises mixing with the organic isocyanate an amount of a compound selected from the group consisting of cadmium naphthenate, cobalt naphthenate, copper naphthenate, lead naphthenate, manganese naphthenate, zinc naphthenate, and mixtures thereof sufficient to reduce the hydrolyzable chlorides in the isocyanate and distilling the mixture to separate the isocyanate.

2. A method of reducing the hydrolyzable chlorine and acidity content of organic isocyanates containing hydrolyzable chlorides which comprises mixing with the organic isocyanate from about 0.01 to about 2 mol percent based on said organic isocyanate of a member selected from the group consisting of cadmium naphthenate, cobalt naphthenate, copper naphthenate, lead naphthenate, manganese naphthenate, zinc naphthenate, and mixtures thereof and distilling the mixture to separate the isocyanate.

3. The process of claim 1 wherein the group member is cadmium naphthenate.

4. The process of claim 1 wherein the group member is cobalt naphthenate.

5. The process of claim 1 wherein the group member is copper naphthenate.

6. The process of claim 1 wherein the group member is lead naphthenate.

7. The process of claim 1 wherein the group member is manganese naphthenate.

8. The process of claim 1 wherein the group member is zinc naphthenate.

9. A method of reducing the hydrolyzable chlorides and acidity content of organic isocyanates containing hydrolyzable chlorides which comprises mixing with the organic isocyanate from about 0.01 to about 2 mol percent based on the organic isocyanate of a member selected from the group consisting of cadmium naphthenate, cobalt naphthenate, copper naphthenate, lead naphthenate, manganese naphthenate, zinc naphthenate and mixtures thereof and heating the mixture at a temperature below the boiling point of the isocyanate for from about 0.5 to about 6 hours, and distilling the mixture to separate the isocyanate.

10. A method of reducing the hydrolyzable chlorides and acidity content of organic isocyanates containing hydrolyzable chlorides which comprises mixing with the organic isocyanate from about 0.01 to about 2 mol percent based on the organic isocyanate of a member selected from the group consisting of cadmium naphthenate, cobalt naphthenate, copper naphthenate, lead naphthenate, manganese naphthenate, zinc naphthenate and mixtures thereof and heating the mixture at a temperature of from about 50° C. to about 210° C. for from about 0.5 to about 6 hours, and distilling the mixture to separate the isocyanate.

References Cited

UNITED STATES PATENTS 3,155,699   11/1964   Powers _____ 260—453

CHARLES B. PARKER, *Primary Examiner.*

D. H. TORRENCE, *Assistant Examiner.*